(12) United States Patent
Goodman et al.

(10) Patent No.: US 6,941,004 B2
(45) Date of Patent: Sep. 6, 2005

(54) METHOD AND APPARATUS FOR ASPERITY SENSING AND STORAGE

(75) Inventors: Cathryn E. Goodman, Glen Ellyn, IL (US); Mark P. Lill, Elgin, IL (US)

(73) Assignee: Motorola, Inc., Schaumburg, IL (US)

( * ) Notice: Subject to any disclaimer, the term of this patent is extended or adjusted under 35 U.S.C. 154(b) by 251 days.

(21) Appl. No.: 10/006,461

(22) Filed: Dec. 6, 2001

(65) Prior Publication Data

US 2003/0108226 A1 Jun. 12, 2003

(51) Int. Cl.$^7$ ................................................ G06K 9/00
(52) U.S. Cl. ...................................................... 382/124
(58) Field of Search ................................. 382/124, 125, 382/126, 115, 116, 117, 118; 235/380, 382, 382.5; 340/5.52, 5.53, 5.82, 5.83; 324/661

(56) References Cited

U.S. PATENT DOCUMENTS

| | | | |
|---|---|---|---|
| 4,353,056 A | | 10/1982 | Tsikos |
| 4,814,690 A | * | 3/1989 | Melcher et al. ............. 324/674 |
| 4,843,226 A | * | 6/1989 | Kato et al. ................... 235/492 |
| 4,902,857 A | * | 2/1990 | Cranston et al. .......... 174/94 R |
| 5,629,889 A | | 5/1997 | Chandra et al. |
| 6,320,394 B1 | | 11/2001 | Tartagni |
| 6,376,393 B1 | * | 4/2002 | Newton et al. ............. 438/783 |
| 2003/0203543 A1 | | 10/2003 | Tanabe et al. |

FOREIGN PATENT DOCUMENTS

EP       1018695 A2  *  7/2000

OTHER PUBLICATIONS

P.L. Rolandi et al., "1M–Cell 6b/Cell Analog Flash Memory for Digital Storage," ISSCC. 1998, Columns 1 and 2, Figures 1–2 (3 pages).
A. Kramer et al., "1.5TXPS Convolver Using 5b Analog Flash for Real–Time Large–Kernel Image Filtering," ISSCC 1998, Columns 1 and 2, Figure 2 (2 pages).

* cited by examiner

*Primary Examiner*—Vikkram Bali
(74) *Attorney, Agent, or Firm*—Fitch, Even, Tabin & Flannery

(57) ABSTRACT

A fingerprint capture device (10) has a plurality of charge storage devices (12) that couple through conductive surfaces (22) to conductive spheres (21) that are disposed within an epoxy that comprises a fingerprint contact surface (13). When raised portions of an object (26) appropriately contact certain conductive spheres (21), the corresponding charge storage device (12) will discharge. This discharging serves both to simultaneously sense the asperity features of the object and to store that sensed information as well.

23 Claims, 3 Drawing Sheets

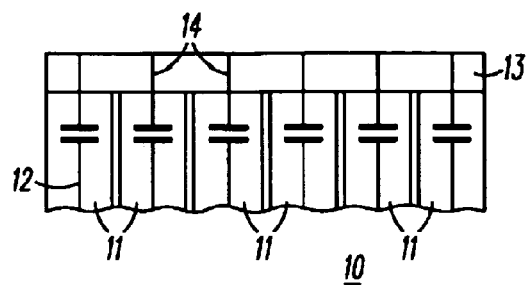
FIG. 1
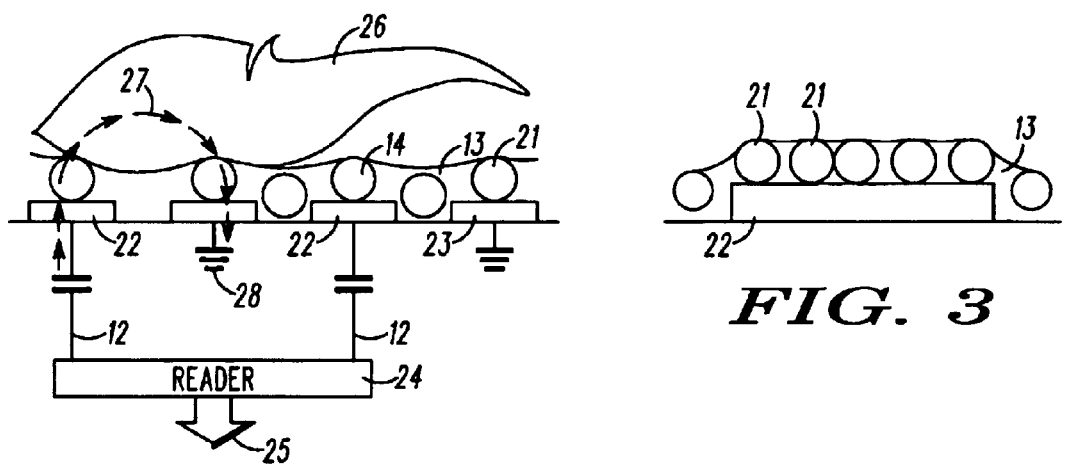
FIG. 2
FIG. 3
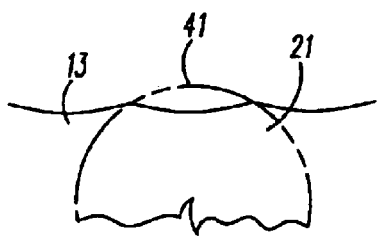
FIG. 4
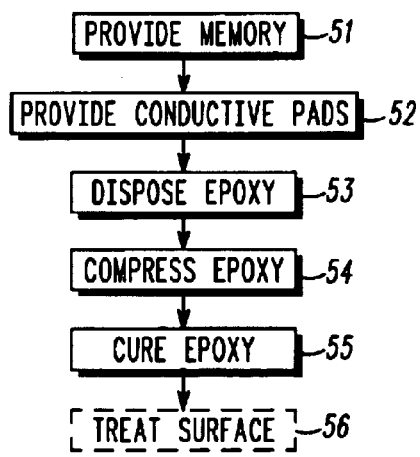
FIG. 5

METHOD AND APPARATUS FOR ASPERITY SENSING AND STORAGE

TECHNICAL FIELD

This invention relates generally to sensing of asperity features and corresponding storage of sensed features.

BACKGROUND

Fingerprints are well understood to be unique to an individual and are therefore useful for identification and verification purposes. The surface asperities (that is, the ridges and valleys) that constitute a fingerprint can be sensed and imaged in a variety of ways and used thereafter to compare with previously stored fingerprint information for these purposes. Unfortunately, these prior art methods and apparatus are not suitable for all purposes.

Inked fingerprint patterns can be inspected and compared by a skilled person but this process requires considerable training and potentially requires significant amounts of time and resources. Such an approach is also inappropriate for dispersed automatic identity verification applications. Thermal sensing mechanisms exist to capture fingerprint asperities but such mechanisms tend to be expensive to manufacture and further typically require complicated (and therefore costly) correlation software to make beneficial use of the results. Radio frequency based mechanisms exist that utilize an active antenna array to penetrate the subdermal layer of the finger with a radio frequency signal to thereby detect the asperities. While such mechanisms are extremely accurate they are also extremely expensive and typically represent an investment of thousands of dollars.

Capacitance based mechanisms again offer relatively good asperity detection but are susceptible to electrostatic discharge that can impair or destroy the mechanism. Although such mechanisms can be made small (such that they are of useful size for many automatic verification applications), many such mechanisms must utilize titanium oxide materials to protect against such electrostatic discharge and this significantly raises the cost of the resultant mechanism. Furthermore, such capacitance based mechanisms again typically require a considerable amount of processing capability to convert the sensed asperities into storable data.

Optical based solutions using a solid-state camera and a light emitting diode as a light source are presently achieving some widespread usage, particularly for portable automatic verification applications. While optical based solutions function reasonably well under many operating conditions, these solutions have form factor requirements (to accommodate, for example, necessary focal length for the camera) that make them unsuitable for many uses. Furthermore, while the cost of such devices (presently about $130 per unit) is relatively favorable as compared to other available technologies, this price is still too high for many desired applications.

A need therefore exists for an asperity sensing and storage solutions that at least minimizes some of these various problems and challenges. In particular, a need exists for a cost-effective, reliable, form factor friendly solution that does not place undue processing demands upon corresponding support hardware and software.

BRIEF DESCRIPTION OF THE DRAWINGS

These needs and others are substantially met through provision of the apparatus and method for asperity sensing and storage as disclosed below. These and other benefits will become more clear upon making a thorough review and study of the following detailed description, particularly when reviewed in conjunction with the drawings, wherein:

FIG. 1 comprises a side elevational schematic view of a device configured in accordance with an embodiment of the invention;

FIG. 2 comprises a side elevational detailed schematic view of a device configured in accordance with an embodiment of the invention;

FIG. 3 comprises a side elevational detailed view of a device configured in accordance with an embodiment of the invention;

FIG. 4 comprises a side elevational detailed view of a device configured in accordance with an embodiment of the invention;

FIG. 5 comprises a flow diagram in accordance with an embodiment of the invention;

DETAILED DESCRIPTION

Figure 6:
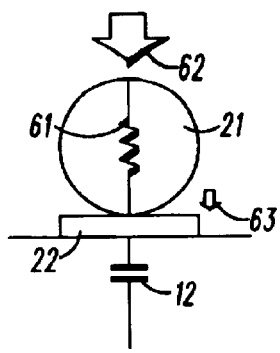
FIG. 6 comprises a side elevational detailed schematic view of a device configured in accordance with an embodiment of the invention.

Viewed generally, the embodiments described below comprise a fingerprint capture device. As used herein, "fingerprints" is used generically to refer to any surface having asperities or other similar surface variations capable of producing a patterned tactile impression, including but not limited to fingerprints, palm prints, and glove prints.

In one embodiment, the fingerprint capture device includes a memory and a fingerprint contact surface. The memory is comprised of a plurality of memory cells wherein each memory cell has a corresponding electrical device. The fingerprint contact surface is disposed substantially coplanar to the memory and has a plurality of conductive paths formed therethrough. At least some of these conductive paths are conductively coupled to at least some of the corresponding electrical devices in the memory cells. In one embodiment, the electrical devices are comprised of charge storage devices.

So configured, an object having asperities on its surface can be placed in contact with the fingerprint contact surface. The electrical devices retain a pre-existing charge or are discharged indirect correspondence to the pattern of the asperities. As a result, the asperity pattern is both sensed and stored simultaneously. Little or no significant post sensing computational processing is required to render the sensed information suitable for storage as it can be stored in exactly the same memory cells that sensed the pattern. Very thin form factors can also be readily accommodated, and the overall device can be rendered at a price point that is at least one order of magnitude less than the least expensive presently available prior art counterpart.

Referring now to FIG. 1, a fingerprint capture device is generally comprised of a plurality of memory cells 11 that each include at least one charge storage device 12 in accordance with well understood prior art technique. In one embodiment, this memory comprises a solid-state memory such as, for example, a random access memory. In a more particular embodiment, the memory can be comprised of a static random access memory. In such a memory, the charged state of the charge storage device 12 represents the logical 1 or 0 that is stored within that corresponding memory cell. A fingerprint contact surface 13 is disposed over the memory cells 11. The fingerprint contact surface has a plurality of conductive paths 14 formed through it such that at least some of the conductive paths 14 are conductively coupled to at least some of the charge storage devices 12. So configured, and as related in more detail below, a conductive path exists between the exterior surface of the fingerprint contact surface 13 and the individual charge storage devices 12 that comprise the memory.

Referring now to FIG. 2 a more detailed presentation of an embodiment of a fingerprint capture device 10 will be presented. As shown in this depiction, each charge storage device 12 electrically couples to a conductive surface 22 as formed on an exterior surface of the memory. These conductive surfaces 22 comprise electrode pads and may be formed of any appropriate conductive material. Preferably, these conductive surfaces 22 are gold plated (the fingerprint contact surface will provide mechanical and chemical protection as regards these conductive surfaces 22 but some amount of moisture will still likely penetrate the fingerprint contact surface; the goldplating will aid in preventing debilitating corrosion of the conductive surfaces 22). In addition, some of the conductive surfaces 22 are coupled to a common rail 28. As depicted, the conductive surfaces 22 are shown to alternate with respect to being coupled to the charge storage devices 12 and the common rail 28. Other arrangements and ratios are possible and may in fact provide improved performance in a given application context. In this embodiment, though not drawn to scale, the conductive surfaces are square pads approximately to thousands of an inch per side.

For a fingerprint capture device 10 intended for use in sensing fingertip fingerprints, the fingerprint contact surface 13 can be approximately 1.25 cm in width by 2.54 cm in length. The memory cells with their corresponding charge storage devices 12 and conductive surfaces 22 would be disposed in an array to assure suitable sensor coverage of the entire portion of the fingerprint contact surface 13 where contact with an object is anticipated.

The fingerprint contact surface 13 is comprised, in this embodiment, of an epoxy material. More particularly the fingerprint contact surface 13 is comprised of an anisotropic material. The conductive paths 14 as formed through the fingerprint contact surface 13 are comprised, in this embodiment, by conductive spheres 21. In this embodiment, the conductive spheres 21 are approximately seven millionths of a meter in diameter (the spheres are not shown to scale in the drawing) and are comprised of nickel. Spheres of such material have been included in so-called conductive epoxy materials in the past. In those past embodiments, however, such spheres have been coated with a high-quality conductor such as silver or gold. Here, the nickel spheres are not coated with such a conductor. Instead, a nickel oxide coating typically forms about the sphere. As a result, although the spheres will conduct electricity the spheres also present considerable resistance to the flow of electricity. Although this approach is highly contrary to prior thinking, at least some benefits of this embodiment will be made more clear below.

When the epoxy material that includes the conductive spheres 21 is deposited on the memory (including the conductive surfaces 22) one or more of the conductive spheres 21 will likely be positioned proximal to one of the conductive surfaces 22. In fact, as depicted in FIG. 3, a plurality of conductive spheres 21 are likely to be positioned proximal to any given conductive surface 22. For example, presuming the conductive surface 22 and conductive sphere 21 dimensions as set forth above, and presuming a sphere doping ratio of 15 to 25 percent, there will be approximately 8 to 12 conductive spheres 21 in contact with each conductive surface 22. This level of redundancy assures that all conductive surfaces 22 (and their corresponding memory cells 11) will be active and available for the fingerprint sensing and storage process.

As related below, the epoxy comprising the fingerprint contact surface 13 is both compressed and cured. Such compression and curing, however, may not insure that an exposed portion of the spheres 21 reliably results. Therefore, and with momentary reference to FIG. 4, the exterior surface of the fingerprint contact surface 13 can be treated to expose a portion 41 of the conductive spheres 21. For example, abrasion or plasma cleansing can be utilized to achieve this result.

In accordance with well understood prior art technique, the charge storage devices 12 are operably coupled to a reader 24 which it self couples to a data bus 25. So configured, the charged or discharged state of the charge storage devices 12 can be ascertained by the reader 24 and the results provided via the bus 25 to other components and elements as appropriate to a given application.

The above described fingerprint capture device 10 functions to simultaneously sense and store tactile impressions information regarding asperities on the surface of an object that contacts the fingerprint contact surface 13. In particular, when an object 26 contacts the fingerprint contact surface 13, protruding aspects of the surface of the object 26 will contact some of the conductive spheres 21 (in the example depicted, two adjacent conductive spheres 21 are so contacted). When this occurs, current 27 can flow from the previously charged charge storage device 12 and the conductive surface 22 as corresponds thereto, through the conductive sphere 21 that is in conductive contact with the conductive surface 22, through the object 26 itself, and through another conductive sphere 21-conductive surface 22 pair to reach the common rail 28. This, of course, will result in discharging that particular charge storage device 12.

Charge storage devices 12 that couple to conductive spheres 21 that do not contact the object 26 will not be discharged and will retain their pre-existing charge. As a result, the fingerprint capture device 10 functions to simultaneously sense asperities on the object by discharging charge storage devices 12 that correspond by location to raised features on an object and to store that sensed information as the discharged and charged states of the array of charge storage devices 12. The discharging phenomena will occur quickly which means that the sensing and storage action can occur quickly as well (sensing windows on the order of 1/100th of a second should be readily attainable). As a result, precise sensing is achievable with even untrained or otherwise inattentive users.

The above device 10 can be an provided in various ways. Referring to FIG. 5, a memory is provided 51 that includes a plurality of memory cells that each include at least one charge storage device. A plurality of exposed conductive pads are then provided 52 on a surface thereof. These conductive pads are provided with conductive connections to the charge storage devices. An anisotropic epoxy containing conductive spheres is then disposed 53 over the memory and the conductive pads and compressed 54 in accordance with well understood prior art technique. This epoxy material can then be cured 55 (for example, by heating for five minutes at 150 degrees Celsius). If desired, the surface can then be treated 56 by abrasion, plasma cleansing, or other treatment that will serve to remove a portion of the epoxy material to thereby expose a conductive surface of the conductive spheres. This process can be employed at the die level if desired or at a higher level of manufacturing completion when appropriate.

As noted earlier, certain prior art fingerprint capture methodologies are subject to electrostatic discharge and require relatively expensive protection from such discharges. The present embodiment features integral protection from electrostatic discharge. Referring to FIG. 6, the conductive spheres 21, being comprised of nickel and typically having an exterior surface comprised of nickel oxide, presents considerable electrical resistance 61. This resistance 61 is not so large as to impede the discharge of a charge storage device 12 in accordance with the methodology described above. The resistance 61 is, however, large enough to significantly attenuate an electrostatic discharge. Consequently, a large electrostatic discharge 62 will be reduced to a significantly smaller surge 63 (or dissipated completely) prior to reaching the conductive surface 22 and the charge storage device 12 that might otherwise be harmed by the electrostatic discharge 62.

Figure 7:
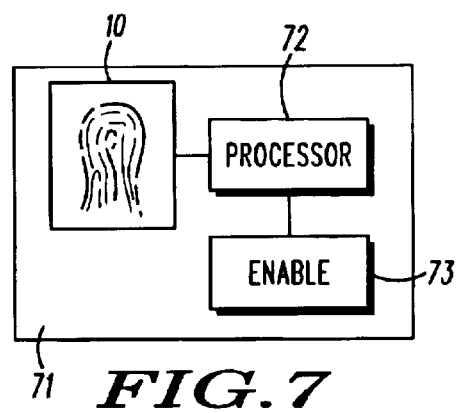
FIG. 7 comprises a block diagram depiction of a device configured in accordance with an embodiment of the invention.

The above embodiments provide for a fingerprint capture device 10 that is relatively small and inexpensive, effective, thin, relatively low power, and easily interfaced with existing processor technologies. As a result, this fingerprint capture device 10 can be readily and economically utilized with a variety of existing mechanisms to imbue such mechanisms with, for example, user identification verification. With reference to FIG. 7, a mechanism 71 having an enabled and disabled state as controlled by an enable feature 73 and a processor 72 to control the enable features 73 can be readily integrally combined with the fingerprint capture device 10. So configured, enablement of the device 71 can be personalized to one or more verified users. Use by a particular verified user can be assured by placement of the user's finger on the fingerprint capture device 10. Because of the various physical, performance, and economic benefits of this fingerprint capture device 10, a variety of devices 71 can be accommodated. For example, the device 71 can be a projectile weapon (such as a handgun or rifle), a barrier operator (such as a building or office door or a cabinet door), a communications device (such as a cellular telephone, a pager, or a two-way communications device such as a police or other public safety dispatch communications radio), a smart card (such as a credit card, debit card, or other identity or information card including passports, drivers licenses, and medical history cards), or a computer (including desktop units, laptop units, personal digital assistants, and the like).

Figure 8:
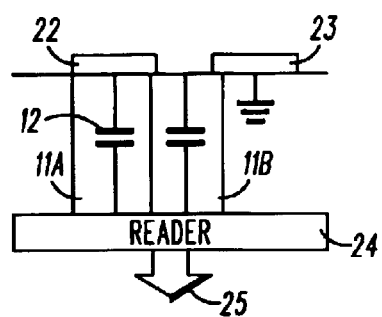
FIG. 8 comprises a side elevational detailed schematic view of a device configured in accordance with an alternative embodiment of the invention.

Other embodiments are within the scope of these teachings. For example, with reference to FIG. 8, not every memory cell need necessarily couple to a conductive surface 22 or 23. While some memory cells 11A are coupled to a corresponding conductive surface 22 in order to sense and store fingerprint information as described above, other memory cells 11B can function as ordinary memory cells that are written to in accordance with ordinary prior art technique. In this way, some of the memory cells 11A are directly responsive to objects contacting the fingerprint contact surface 13 while other memory cells 11B are available to store other information. For example, a reference set of data representing tactile impressions information against which presently sensed and stored information can be compared is storable in the latter category of memory cells 11B.

Figure 9:
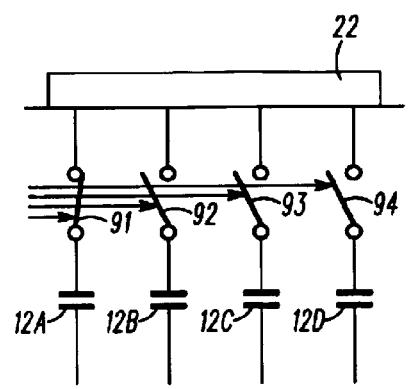
FIG. 9 comprises a side elevational detailed schematic view of a device configured in accordance with an alternative embodiment of the invention.

Referring to FIG. 9, in another embodiment, each conductive surface 22 and potentially connect to any of a plurality of charge storage devices 12A through 12D (four such charge storage devices are depicted in FIG. 9; fewer or more such charge storage devices can be similarly accommodated). Each such charge storage device 12A through 12D has a corresponding switch 91 through 94, which switch can be controlled by an appropriate memory controller, processor, or the like. As depicted, only one switch 91 is closed such that only one charge storage device 12A his electrically coupled to the conductive surface 22. So configured, only this first charge storage device 12A will be available to discharge when operating this device to capture fingerprint information. By opening this first switch 91 and then closing the second switch 92, for example, a second sensing and capture of fingerprint information can be conducted without losing information that is stored in the first charge storage device 12A. In this way, multiple samplings of a given fingerprint can be effected without losing information and without necessarily requiring complicated or time-consuming signal processing and storage protocols.

Figure 10:
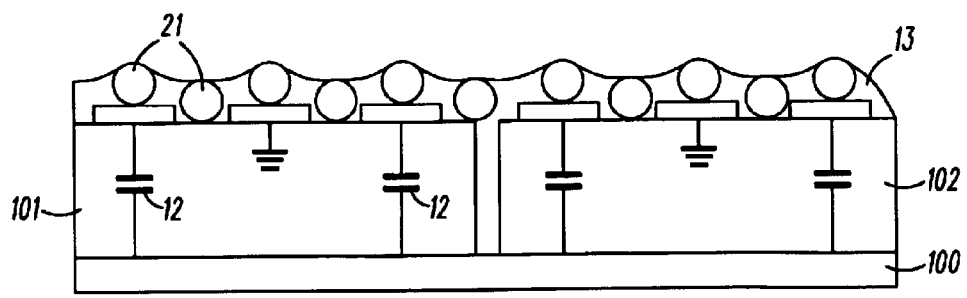
FIG. 10 comprises a side elevational detailed schematic view of a device configured in accordance with an alternative embodiment of the invention.

Referring to FIG. 10, in another embodiment, multiple memory dies 101 and 102 can be utilized in conjunction with a single fingerprint contact surface 13 to form a single fingerprint capture device 10 (only two such dies are shown in this embodiment; more typically, a large number of individual dies would likely be utilized to support a functionally useful fingerprint contact surface area). These multiple dies 101 and 102 can be supported on a common frame or substrate 100 as appropriate to the particular application. These multiple dies 101 and 102 can share a common reader and bus or can function as independent memory elements as appropriate to the application.

As has been shown, various embodiments can incorporate and benefit from the essential teachings set forth herein. Those skilled in the art will recognize that yet other modifications, alterations, and combinations can be realized without departing from the spirit and scope of the invention as described. Such modifications, alterations, and combinations are to be considered as within these teachings and the scope of the invention.

We claim:

1. A fingerprint capture device comprising:
   a memory comprised of a plurality of memory cells wherein each memory cell has a corresponding electrical device;
   a fingerprint contact surface comprised of an epoxy material disposed substantially coplanar to the memory wherein the fingerprint contact surface has a plurality of conductive paths formed through the fingerprint contact surface and wherein at least some of the conductive paths are substantially directly conductively coupled to at least some of the corresponding electrical devices and wherein at least some of the conductive paths are comprised of conductive spheres wherein at least a portion of some of the conductive spheres physically contacts the memory, and wherein at least a portion of some of the conductive spheres is physically exposed to an exterior of the fingerprint contact surface.

2. The fingerprint capture device of claim 1 wherein the memory comprises a solid state memory.

3. The fingerprint capture device of claim 2 wherein the solid state memory comprises a random access memory.

4. The fingerprint capture device of claim 3 wherein the random access memory comprises a static random access memory.

5. The fingerprint capture device of claim 2 wherein the corresponding electrical device comprises a charge storage device.

6. The fingerprint capture device of claim 1 wherein the memory includes a plurality of conductive surfaces formed on an exterior surface thereof.

7. The fingerprint capture device of claim 6 wherein some of the plurality of conductive surfaces are each electrically coupled to a corresponding one of the corresponding electrical devices.

8. The fingerprint capture device of claim 6 wherein some of the plurality of conductive surfaces are electrically coupled to a common rail.

9. The fingerprint capture device of claim 6 wherein some of the plurality of conductive surfaces are each electrically coupled to a corresponding one of the corresponding electrical devices and some of the plurality of conductive surfaces are electrically coupled to a common rail.

10. The fingerprint capture device of claim 1 wherein at least some of the conductive spheres present a substantial resistance to current flow.

11. The fingerprint capture device of claim 10 wherein at least some of the conductive spheres are comprised of nickel oxide.

12. The fingerprint capture device of claim 1 wherein at least a plurality of the conductive spheres have a diameter of approximately seven millionths of a meter.

13. A method for sensing and storing tactile impressions information comprising:
    providing a memory comprised of a plurality of memory cells wherein each memory cell has a corresponding electrical device;
    providing a contact surface disposed substantially coplanar to the memory wherein the contact surface has a plurality of conductive paths formed through the contact surface, by, at least in part, providing a contact surface disposed substantially coplanar to the memory wherein the contact surface has a plurality of conductive spheres disposed therein which conductive spheres comprise conductive paths, and wherein at least some of the conductive paths are substantially directly conductively coupled to at least some of the corresponding electrical devices;
    placing an object having a surface with asperities on the contact surface;
    simultaneously sensing and storing in the memory tactile impressions information regarding at least some of the asperities by discharging at least some of the electrical devices as correspond to locations where asperities directly contact the contact surface.

14. The method of claim 13 wherein providing a memory comprised of a plurality of memory cells wherein each memory cell has a corresponding electrical device includes providing a memory comprised of a plurality of memory cells wherein each memory cell has a corresponding charge storage device.

15. The method of claim 13 wherein discharging at least some of the electrical devices includes discharging at least some of the electrical devices through at least some of the conductive spheres.

16. The method of claim 13 and further comprising dissipating electrostatic discharge within at least some of the conductive paths.

17. The method of claim 13 and further comprising storing in the memory a reference set of data representing tactile impressions information against which subsequently sensed and stored tactile impressions information is to be compared.

18. A method for sensing and storing fingerprint information comprising:
    providing a memory comprised of a plurality of memory cells wherein each memory cell has a corresponding charge storage device and wherein the memory further includes a plurality of conductive pads disposed on a surface thereof such that some of the conductive pads are electrically coupled to at least one of the charge storage devices and some of the conductive pads are electrically coupled to a common rail;
    providing a contact surface formed at least in part of cured epoxy and being disposed substantially coplanar to the memory wherein the contact surface has a plurality of conductive spheres disposed at least partially within the contact surface and wherein at least some of the conductive spheres are conductively coupled to at least some of the conductive pads;
    placing an object having fingerprint features on the contact surface;
    simultaneously sensing and storing in the memory fingerprint information regarding at least some of the fingerprint features by discharging at least some of the charge storage devices as correspond to locations where fingerprint features directly contact the contact surface through a discharge path that includes a conductive pad as coupled to a charge storage device to be discharged, at least a first conductive sphere, the object, at least a second conductive sphere, and a conductive pad as coupled to the common rail.

19. The method of claim 18 wherein providing a contact surface having a plurality of conductive spheres includes providing a contact surface having a plurality of conductive spheres comprised of nickel oxide.

20. A method for sensing and storing tactile impressions information comprising:
    providing a plurality of discrete memory units, each of the memory units being comprised of a plurality of memory cells wherein each memory cell has a corresponding electrical device;
    providing a contact surface disposed substantially coplanar to at least some of the memory units wherein the contact surface has a plurality of conductive paths formed through the contact surface wherein the contact surface has a plurality of conductive spheres disposed therein which conductive spheres comprise conductive paths, and wherein at least some of the conductive paths are substantially directly conductively coupled to at least some of the corresponding electrical devices for a plurality of the memory units;
    placing an object having a surface with asperities on the contact surface;
    simultaneously sensing and storing in at least a plurality of the memory units tactile impressions information regarding at least some of the asperities by discharging at least some of the electrical devices as correspond to locations where asperities directly contact the contact surface.

21. The method of claim 20 wherein providing a plurality of discrete memory units, each of the memory units being comprised of a plurality of memory cells wherein each memory cell has a corresponding electrical device includes providing a plurality of discrete memory units, each of the memory units being comprised of a plurality of memory cells wherein each memory cell has a corresponding charge storage device.

22. The method of claim 20 wherein discharging at least some of the electrical devices includes discharging at least some of the electrical devices through at least some of the conductive spheres.

23. The method of claim 22 and further comprising dissipating electrostatic discharge within at least some of the conductive paths.

* * * * *